(12) United States Patent
Klein-Hitpass

(10) Patent No.: US 10,465,791 B2
(45) Date of Patent: Nov. 5, 2019

(54) PLANETARY CARRIER

(71) Applicant: Siemens Aktiengesellschaft, München (DE)

(72) Inventor: Arno Klein-Hitpass, Aachen (DE)

(73) Assignee: FLENDER GMBH, Bocholt (DE)

( * ) Notice: Subject to any disclaimer, the term of this patent is extended or adjusted under 35 U.S.C. 154(b) by 90 days.

(21) Appl. No.: 15/680,648

(22) Filed: Aug. 18, 2017

(65) Prior Publication Data
US 2018/0051798 A1 Feb. 22, 2018

(30) Foreign Application Priority Data
Aug. 19, 2016 (EP) .................................... 16184865

(51) Int. Cl.
*F16H 57/08* (2006.01)
*F16H 1/28* (2006.01)

(52) U.S. Cl.
CPC ......... *F16H 57/082* (2013.01); *F16H 1/2827* (2013.01); *F16H 1/2836* (2013.01); *F16H 1/2863* (2013.01)

(58) Field of Classification Search
CPC ........ F16H 57/082; F16H 1/46; F16H 1/2827; F16H 1/2863; F16H 1/2836; F16H 2057/125; F16H 57/12; F16H 25/2209; F16H 55/18; F16H 55/24
USPC .......................... 475/346–348, 334
See application file for complete search history.

(56) References Cited

U.S. PATENT DOCUMENTS

| | | | | |
|---|---|---|---|---|
| 4,043,216 A * | 8/1977 | Steer | ..................... | F16H 1/2836 475/341 |
| 5,037,214 A * | 8/1991 | Dougherty | ............ | B60B 27/001 384/561 |
| 2004/0259679 A1 * | 12/2004 | Becquerelle | .......... | F16H 1/2827 475/331 |
| 2009/0105031 A1 * | 4/2009 | Sefcik | ..................... | B23P 15/00 475/230 |
| 2010/0292044 A1 * | 11/2010 | Lahtinen | ............... | F16H 1/2836 475/346 |
| 2012/0028756 A1 * | 2/2012 | Lopez | .................. | F16H 57/082 475/346 |
| 2013/0035194 A1 * | 2/2013 | Ai | .......................... | B64C 27/12 475/249 |
| 2013/0269479 A1 * | 10/2013 | van der Merwe | .... | F16H 57/025 74/606 R |
| 2015/0038284 A1 * | 2/2015 | Bauer | .................. | F16H 57/082 475/337 |
| 2017/0159784 A1 * | 6/2017 | Basin | ...................... | F16H 45/02 |
| 2018/0252300 A1 * | 9/2018 | Okamoto | ................ | F16H 61/02 |

FOREIGN PATENT DOCUMENTS

DE 103 34 824 A1 5/2005
WO WO 2009083657 A1 7/2009

OTHER PUBLICATIONS

Klein-Hitpass et al., U.S. Pat. No. 8,621,940, Jan. 7, 2014, 2012/0067138, Mar. 22, 2012.

(Continued)

Primary Examiner — Jeffrey A Shapiro
(74) Attorney, Agent, or Firm — Henry M. Feiereisen LLC

(57) ABSTRACT

A planetary carrier includes an input-side hub, an input-side outer leg, an output-side leg including an output-side axle seat for receiving an output-side end of a planetary axle, a web connecting the input-side outer leg with the output-side leg and an input-side inner leg arranged in parallel to the input-side outer leg. The input-side inner leg includes an input-side axle seat for receiving an input-side end of the planetary axle.

7 Claims, 7 Drawing Sheets

(56) References Cited

OTHER PUBLICATIONS

Klein-Hitpass et al., U.S. Pat. No. 9,267,864, Feb. 23, 2016, 2013-0180319, Jul. 18, 2013.
Klein-Hitpass et al., 2015-023907, Aug. 27, 2015.
Klein-Hitpass et al., 2016-0229009, Aug. 11, 2016.

* cited by examiner

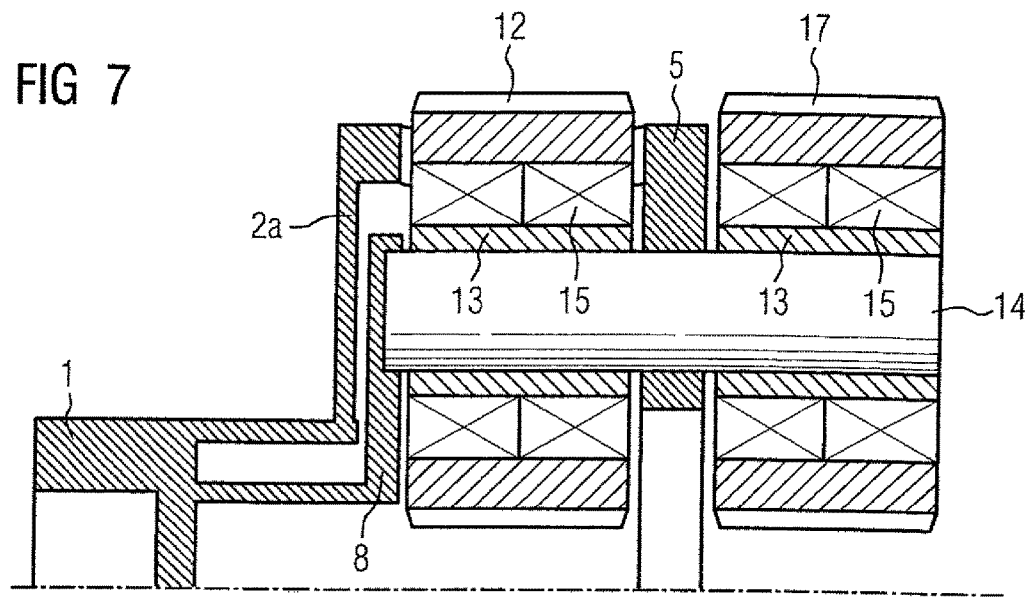
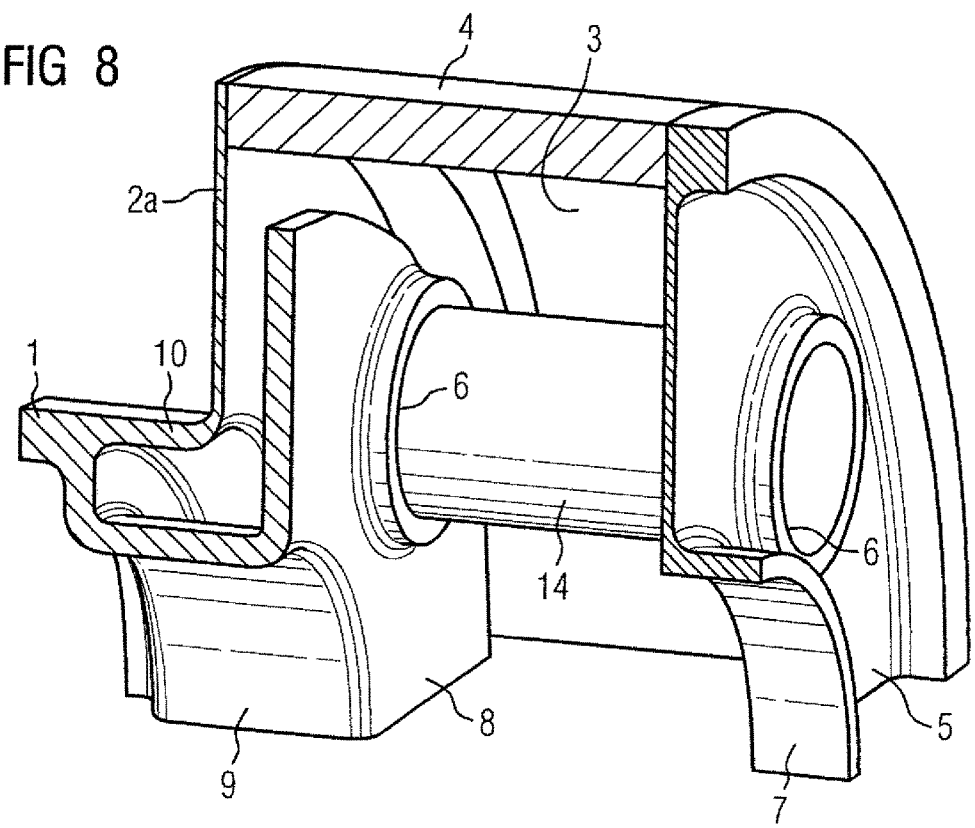

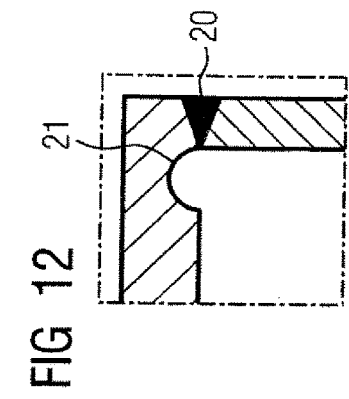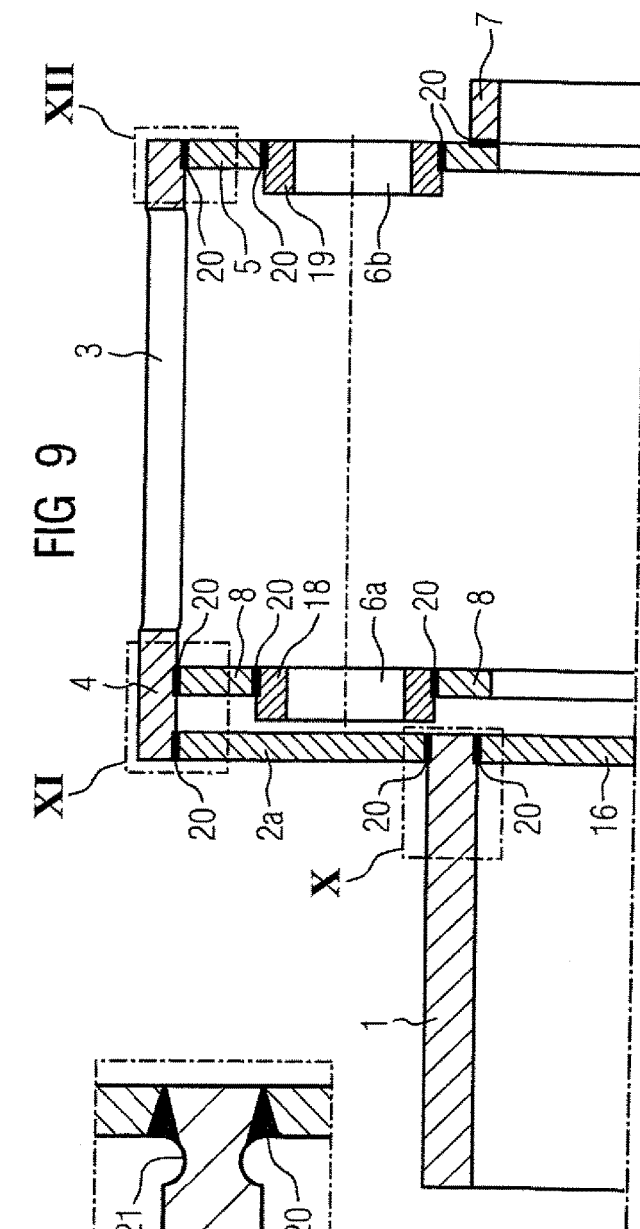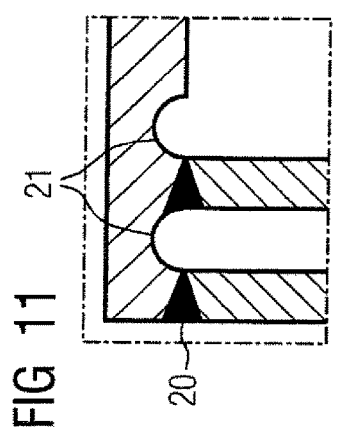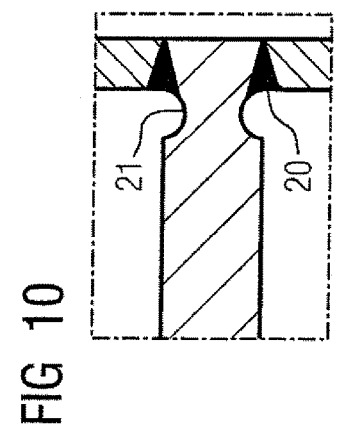

PLANETARY CARRIER

CROSS-REFERENCES TO RELATED APPLICATIONS

This application claims the priority of European Patent Application, Serial No. 16184865.0, filed Aug. 19, 2016, pursuant to 35 U.S.C. 119(a)-(d), the content of which is incorporated herein by reference in its entirety as if fully set forth herein.

BACKGROUND OF THE INVENTION

The present invention relates to a planetary carrier.

In the case of planetary carriers with two legs, the legs distort relative to one another under load. In addition to the torque acting on the planetary carrier the level of distortion also depends significantly on the design of the planetary carrier. In the case of a two-legged planetary carrier, it is not possible to suppress the relative distortion of the two legs against one another by changing the strength of the legs or webs.

It would therefore be desirable and advantageous to provide an improved planetary carrier to obviate prior art shortcomings.

SUMMARY OF THE INVENTION

According to one aspect of the present invention, a planetary carrier includes an input-side hub, an input-side outer leg, an output-side leg including an output-side axle seat for receiving an output-side end of a planetary axle, a web connecting the input-side outer leg with the output-side leg, and an input-side inner leg arranged in parallel to the input-side outer leg, the input-side inner leg including an input-side axle seat for receiving an input-side end of the planetary axle.

According to the torque introduction from a drive into the planetary carrier and the torque diversion from the planetary carrier to an output, the components of the planetary carrier, such as hubs, legs and axle seats of the planetary axle, are differentiated with the position determinations "input side" or "output side". The output-side leg has at least one output-side axle seat for each output-side end of a planetary axle. The planetary carrier also has an input-side inner leg, which is arranged in parallel to the input-side outer leg and has at least one input-side axle seat for each input-side end of the planetary axle. A planetary axle can be inserted into corresponding axle seats, which are arranged in the input-side inner leg and the output-side leg, respectively.

The difference between "inner" and "outer" leg is defined such that when the planetary carrier is viewed along the axis of rotation R of the planetary carrier from the input side, the input-side outer leg is closer to the observer than the input-side inner leg. Therefore, the input-side outer leg is arranged in an "outer" region of the planetary carrier, whereas relative to it the input-side inner leg is arranged further in an "inner" region of the planetary carrier.

The input-side inner leg supports the input-side planetary axle ends by way of its planetary axle seats. The input-side outer leg is connected to the webs. The webs are also connected to the output-side leg. Seats for the planetary axles are likewise located in the output-side leg.

The planetary carrier has two legs, one inner and one outer, on the input side. As a consequence of the parallelism of the input-side outer and inner leg, the planetary carrier according to the invention enables an adjustment of the torsional stiffness of the inner load path, which leads from the input-side hub to the input-side axle seat, to the torsional stiffness of the outer load path, which leads from the output-side hub to the output-side axle seat, such that under load a defined relative distortion of the input-side axle seat is established in relation to the output-side axle seat. With an optimal adjustment, the two axle seats distort by the same degree, such that under load the planetary axle experiences no misalignment.

A planetary carrier according to the invention is relatively light and the legs of which under load distort barely or not at all relative to one another.

The present invention is based on the recognition that from a structural mechanical point of view the planetary carrier is a torsion spring, i.e. a rotary spring. In such cases the seats of the planetary axles in the two legs are connected to one another by way of a torsion spring. A distortion of the planetary carrier legs which occurs under load and the planetary axle misalignment which results therefrom can thus only be varied by varying the torsional stiffness of this torsion spring.

Due to a parallelism of the load path from the region of the torque introduction on the input-side hub to the planetary axle seats of the input-side and output-side leg, its relative rotational displacement under load can be controlled by varying the stiffness of the inner and the outer load path. A load path is understood to relate to a path on which, on account of an outer loading from the input side, the forces are routed through the planetary carrier to the output side.

The torsional stiffness of the outer ("long") load path is influenced primarily by way of the thickness and the width of the webs and the size of the cutouts for the planet wheels, i.e. the shape of the webs, the strength of the legs and the diameter of the input-side hub. The torsional stiffness of the inner ("short") load path is influenced primarily by way of the diameter and the thickness of the input-side inner leg and its structural connection with the planetary carrier.

Between the torque introduction and the first torque outlet point, i.e. the input-side planetary axle seats, the load path to the second torque outlet point, i.e. the output-side planetary axle seats, is paralielized such that the torsional strengths of the two paths can be varied separately from one another.

By separating the flux of force, the notch between the planetary axle bores is additionally deburred toward the input-side hub or the notch point is omitted.

Further advantageous features are set forth in the dependent claims, and may be combined with one another in any desired manner in order to achieve further advantages.

According to another advantageous feature of the present invention, the input-side inner leg can be fastened to the input-side hub and/or to the input-side outer leg and/or to the at least one web.

In the case that the input-side inner leg is connected to the input-side hub, both input-side legs are connected to the input-side hub. Advantageous in the case of a fastening to the input-side hub is in such cases that a relatively long load path is available for adjusting to the load path of the second, output-side axle seat. Advantageous in the case of a fastening to the input-side outer leg is in such cases that in the case of cast or welded components a good accessibility is achieved for cleaning the transitions. Advantageous in the case of a fastening to the at least one web is in such cases that in the case of cast or welded components a good accessibility is achieved for cleaning the transitions. Furthermore, smaller wall thicknesses are sufficient in this case.

According to another advantageous feature of the present invention, the torsional stiffness of the inner load path, which leads from the input-side hub to the input-side axle seat, can be adjusted to the torsional stiffness of the outer load path, which leads from the output-side hub to the output-side axle seat, such that under load a defined relative distortion of the input-side axle seat is established in relation to the output-side axle seat. Advantageous here is that with an optimal adjustment, the two axle seats distort by the same degree, such that under load the planetary axle does not experience any or only a relatively small misalignment.

A planetary carrier according to the present invention can be used for wind turbine gearboxes. This is advantageous since with wind power plants very high torques are introduced from the input side (rotor side) into the planetary carrier.

According to another advantageous feature of the present invention, the planetary carrier can be made of a number of parts. It is possible for the planetary carrier to be assembled from several individual parts by means of welded connections or screw connections. An assembly of a number of components is advantageous here in that the production of input-side legs is facilitated.

According to another advantageous feature of the present invention, the planetary carrier can be assembled from a number of individual parts by means of welded connections. Relief notches can be arranged along at least one partial length of the welded connections.

According to another advantageous feature of the present invention, one or a number of individual part(s) may be simple cylindrical or disk-shaped elements in the case of a planetary carrier welded together from individual parts. For instance, the basic body of the planetary carrier, i.e. the element having the webs, can be formed from a central pipe with cutouts for the planets. Moreover, the connection of the input-side hub to the central pipe can take place by way of a torsion disk. All welded seams are advantageously welded through and closed. The welded seams are advantageously embodied as round seams, i.e. no notches are present in the welded seam. In such cases the welded seams are advantageously positioned such that they are located in regions with a relatively minimal load.

Any number of planets can be supported in the planetary carrier. Conventional planet wheels have three or four planets. However, fewer than three or more than four planet wheels can be inserted into the planetary carrier.

All legs can have any geometry, e.g. be embodied as full disks, spoke wheels, or arched disks. The legs, in particular the input-side inner leg, may have constrictions and/or cutouts between the axle seats, by means of which design parameters such as number, position, size and shape etc. the torsional strength of the legs can be influenced.

The planetary carrier can be made from any material, e.g. cast iron, steel or plastic, in particular fiber-glass reinforced plastic (GRP).

BRIEF DESCRIPTION OF THE DRAWINGS

Other features and advantages of the present invention will be more readily apparent upon reading the following description of currently preferred exemplified embodiments of the invention with reference to the accompanying drawings, in which:

FIG. 7 shows a longitudinal section of a fifth embodiment of a planetary carrier according to the present invention with a one-legged bearing;

FIG. 8 shows a perspective view of a cutout of a planetary carrier similar to that in FIG. 2;

FIG. 9 shows a longitudinal section of a sixth embodiment of a planetary carrier according to the present invention with a two-legged hub bearing;

FIG. 10 shows an enlarged detailed view of an area marked X in FIG. 9 of the planetary carrier of FIG. 9;

FIG. 11 shows an enlarged detailed view of another area marked XI in FIG. 9 of the planetary carrier of FIG. 9;

FIG. 12 shows an enlarged detailed view of still another area marked XII in FIG. 9 of the planetary carrier of FIG. 9;

DETAILED DESCRIPTION OF PREFERRED EMBODIMENTS

Figure 1:
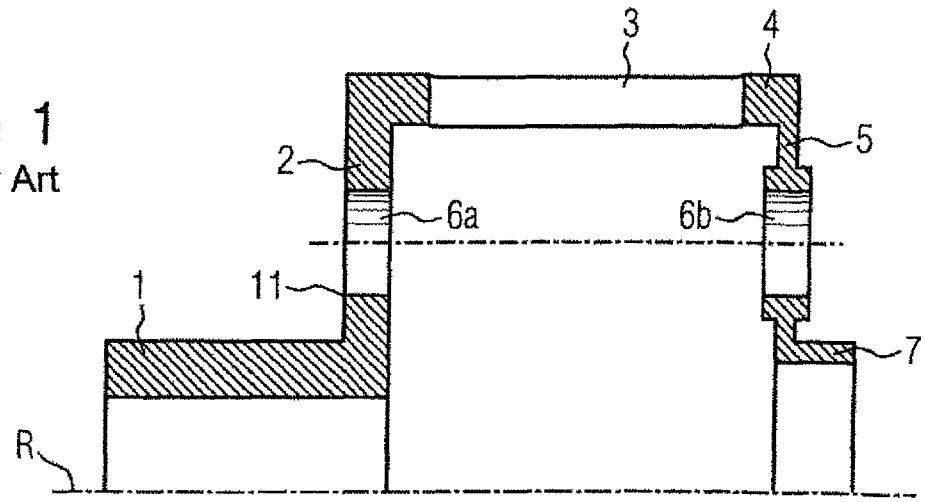
FIG. 1 shows a longitudinal section of a conventional two-legged planetary carrier.

Throughout the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows a conventional two-legged planetary carrier. An input-side hub 1, which is embodied as an axially running pipe stub, is connected to an input-side leg 2, which is embodied as a radially running disk. The input-side hub 1 is also referred to as a long hub. Webs 4 which are embodied as an axially running pipe provided with cutouts 3 are arranged on the outer diameter of the input-side leg 2. The webs 4 connect the input-side leg 2 with an output-side leg 5, which is likewise embodied as a radially running disk. An output-side hub 7 which is embodied as an axially running pipe stub is arranged on the inner diameter of the output-side leg 5. The output-side hub 7 is also referred to as a short hub.

The planetary carrier is mounted rotatably about its axis of rotation R in a gearbox housing, by the two hubs 1, 7 being supported with respect to the gearbox housing by means of bearings, be they roller or slide bearings.

Axially aligned bores 6a, 6b which form seats for planetary axles upon which planet wheels are mounted rotatably are introduced in each case into the two legs 2, 5. In such cases an input-side end of a planetary axle is inserted into an input-side axle seat 6a in the input-side leg 2 and an output-side end of a planetary axle is inserted into an output-side axle seat 6b in the output-side leg 5. A notch 11 on which voltage peaks develop is formed at the position at which the input-side axle seat 6a is arranged in the input-side leg 2.

The webs 4 extend between the two legs 2, 5 and between the cutouts 3, through which the cogs of the planet wheels project in order to mesh with a ring gear surrounding the planetary carrier. A sun wheel which likewise meshes with the planet wheels is arranged in the axial center of the planetary carrier.

The planetary carrier can be arranged in a planetary gearbox such that a torque of a drive, for instance of a rotor shaft of a wind power plant, is brought onto the input-side hub 1. In such cases the planet wheels mesh with the ring gear and the centrally arranged sun wheel in such a way that with a stationary ring gear a rotation of the input-side hub 1 results in a quicker rotation of the central sun wheel. The rotation of the sun wheel axle, on which the sun wheel is arranged in a torsion-resistant manner, is transmitted as an output if necessary to a further gearbox stage downstream of the planetary carrier and then finally to a machine, e.g. a generator, downstream of the gearbox.

According to the side of the torque introduction from a drive, in the view on the left side shown in FIG. 1, and the side of the torque diversion to an output, in the view on the right side shown in FIG. 1, the components of the planetary carrier such as the two hubs 1, 7, the two legs 2, 5 and the two axle seats 6a, 6b are differentiated using the position determinations "output-side" or "input-side".

Figure 2:
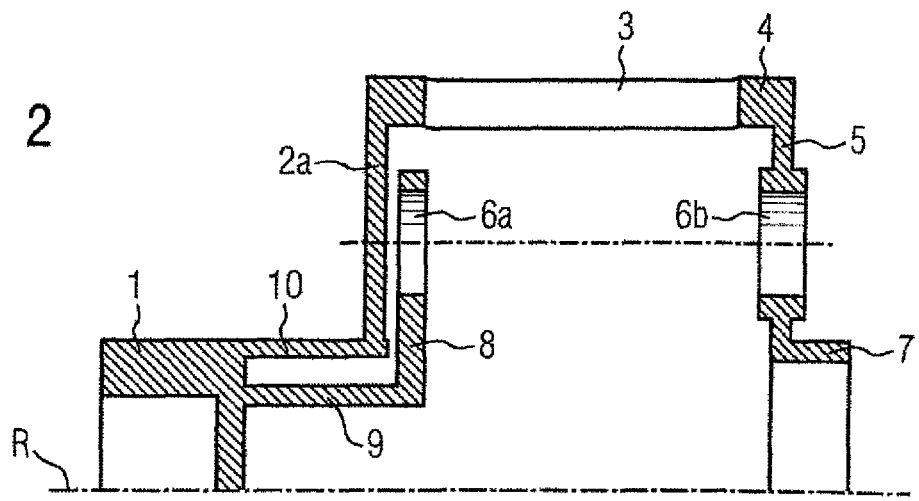
FIG. 2 shows a longitudinal section of a first embodiment of a planetary carrier according to the present invention with a two-legged hub bearing.

FIG. 2 shows a first embodiment of a planetary carrier according to the present invention. Parts corresponding with those in FIG. 1 are denoted by identical reference numerals and not explained again. The description below will center on the differences between the embodiments. In this embodiment, provision is made for two input-side legs 2a, 8 arranged in parallel. A distinction is hereby made between an input-side inner leg 8 and an output-side outer leg 2a. The difference between "inner" and "outer" leg is defined in that when the planetary carrier is viewed along the axis of rotation R of the planetary carrier from the input side, i.e. in the view from the left in FIG. 2, the input-side outer leg 2a is closer to the observer than the input-side inner leg 8; therefore the input-side outer leg 2a is arranged in the "outer" region of the planetary carrier, whereas relative to it the input-side inner leg 8 is arranged further in the "interior" of the planetary carrier.

The input-side inner leg 8 is fastened to the input-side hub 1 by way of an input-side inner hub 9. The input-side outer leg 2a is fastened to the input-side hub 1 by way of an input-side outer hub 10. The input-side inner hub 9 is an axially running pipe stub here, which is arranged closer to the axis of rotation R than the axially running pipe stub, which forms the input-side outer hub 10. In such cases the input-side axle seat 6a is arranged exclusively in the input-side inner leg 8.

On account of the parallelism of the load path from the region of the torque introduction on the input-side hub 1 to the axle seats 6a of the planets in the input-side inner leg 8 and to the axle seats 6b of the planets in the output-side leg 5, under load its relative rotational displacement can be controlled by varying the stiffness of the inner load path, see reference character 1 via 9, 8 to 6a in FIG. 2, and of the outer load path, see reference character 1 via 10, 2a, 3, 4, 5 to 6b in FIG. 2. By separating the flux of force, the notch 11 between the axle seats 6a is additionally deburred toward the input-side hub 1, or the notch point 11 is omitted.

The torsional stiffness of the outer ("long") load path is influenced primarily by way of the thickness and the width of the webs 4 and the size of the cutouts 3 for the planet wheels, i.e. the shape of the webs 4, the wall strength of the outer leg 2a and the thickness and the length of the input-side outer hub 10. The torsional stiffness of the inner ("short") load path is influenced primarily by way of the diameter and the thickness of the input-side inner hub 9.

The torsional stiffness of the inner load path, which leads from the input-side hub 1 to the input-side axle seat 6a, is hereby adjusted to the torsional strength of the outer load path, which leads from the input-side hub 1 to the output-side axle seat 6b, such that under load a defined relative distortion of the input-side axle seat 6a is established in relation to the output-side axle seat 6b.

Figure 3:
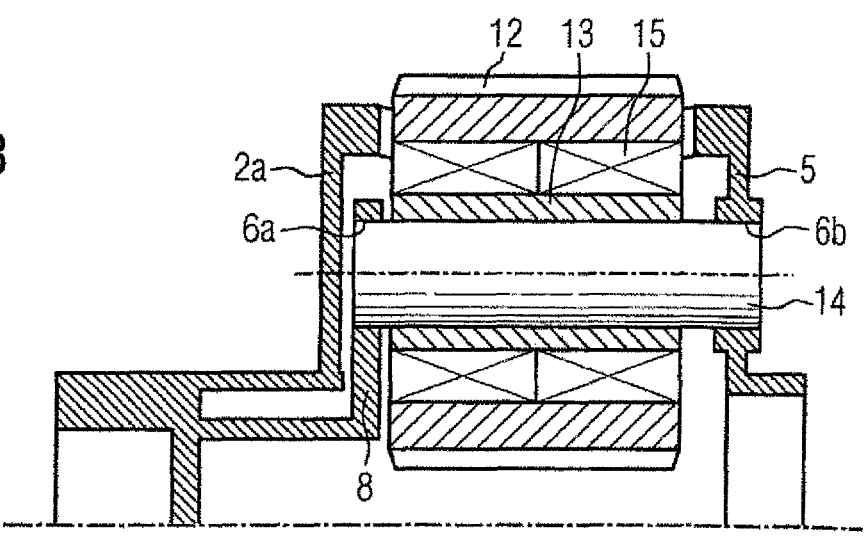
FIG. 3 shows a longitudinal section of the planetary carrier according to FIG. 2 with a planet wheel, planetary axle and planet wheel bearing.

FIG. 3 shows the planetary carrier according to FIG. 2 with a planet wheel 12, a planetary axle 14, a bearing inner ring 13 and a planetary bearing 15. The input-side end of the planetary axle 14 is located in the input-side axle seat 6a, which is arranged in the input-side inner leg 8, while the output-side end of the planetary axle 14 is located in the output-side axle seat 6b, which, as in the conventional planetary carrier according to FIG. 1, is arranged in the output-side leg 5.

Figure 4:
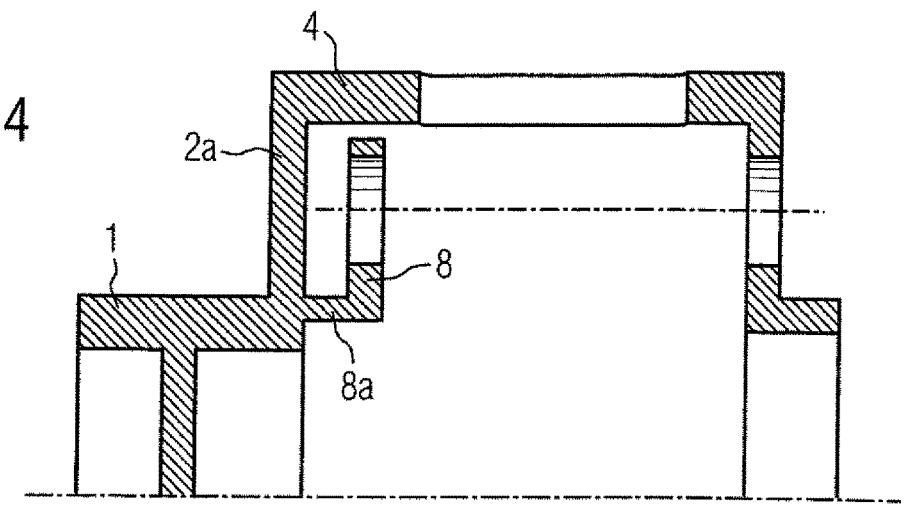
FIG. 4 shows a longitudinal section of a second embodiment of a planetary carrier according to the present invention with a two-legged hub bearing.

FIG. 4 shows a further embodiment of a planetary carrier according to the present invention, with a hub bearing on both sides. Compared to the embodiment shown in FIG. 2, the input-side inner leg 8 is not fastened here by way of an inner hub 9 to the input-side hub 1, but instead by way of an axial pipe stub 8a on the input-side outer leg 2a.

Figure 5:
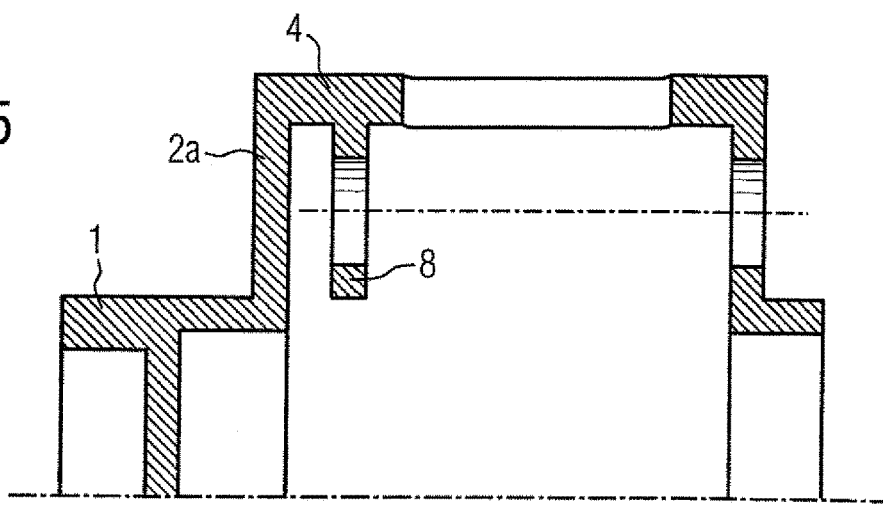
FIG. 5 shows a longitudinal section of a third embodiment of a planetary carrier according to the present invention with a two-legged hub bearing.

FIG. 5 shows a further embodiment of an inventive planetary carrier with a hub bearing on both sides. In such cases, compared to the embodiment shown in FIG. 2, the input-side inner leg 8 is not fastened by way of an inner hub 9 to the input-side hub 1, but instead to the web 4, more precisely: to the input-side half of the web 4.

Figure 6:
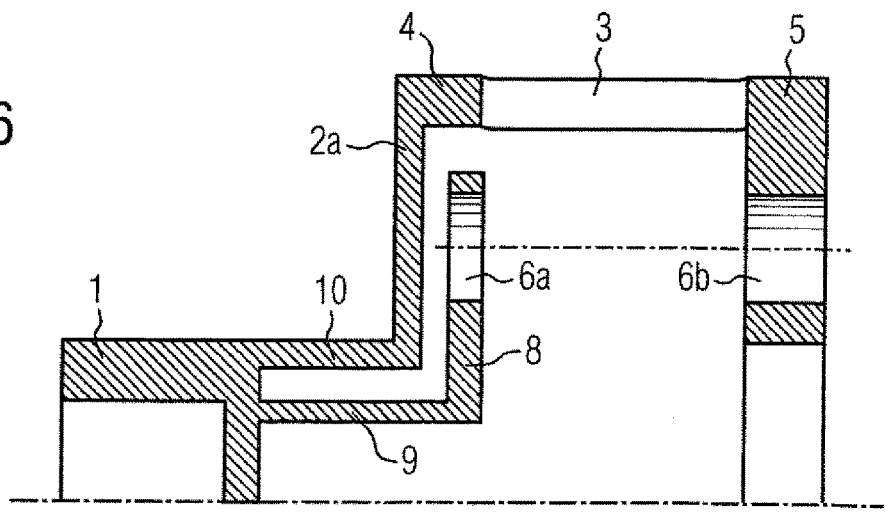
FIG. 6 shows a longitudinal section of a fourth embodiment of a planetary carrier according to the present invention with a one-legged bearing.

FIG. 6 shows a further embodiment of a planetary carrier according to the present invention. The design of the planetary carrier corresponds largely to that of the planetary carrier according to FIG. 2, except for the absence of an output-side bearing in an output-side hub. Instead, the planetary carrier according to FIG. 6 is mounted on one side of the input-side hub, e.g. on the fly.

FIG. 7 shows a further embodiment of a planetary carrier according to the present invention with a one-sided bearing. The planetary axle projects on the output side so far beyond the output-side leg 5 that a planet wheel 17 clamped on the fly between the ring gear and the sun wheel is located on the planetary axle 14. In addition, a planet wheel 12 introduced between the input-side legs 2a, 8 and the output-side leg 5 is mounted on the planetary axle 14.

For ease of understanding of the invention, reference is made to FIG. 8 which shows a perspective view of a cutout of a planetary carrier according to the present invention, which is similar to the planetary carrier shown in FIG. 2. The planetary axle 14 is also illustrated.

FIG. 9 shows a planetary carrier, which has a pipe with cutouts 3 provided for the planets (not shown), as a web 4, two legs 5, 8, a torsion disk as an outer leg 2*a*, a hub 1, to which the torque applies, reinforcing rings 18, 19 for receiving the planetary axle bolts, an optional hub 7 for receiving a possible web bearing and an optional cover plate 16. FIG. 9 also shows the arrangement of the welded seams 20 between the individual components. All welded seams 20 are welded through and closed.

FIGS. 10 to 12 show enlarged detailed views of areas X, XI and XII of the planetary carrier shown in FIG. 9. A relief notch 21 is arranged in addition to the welded seams 20 in each case.

Figure 13:
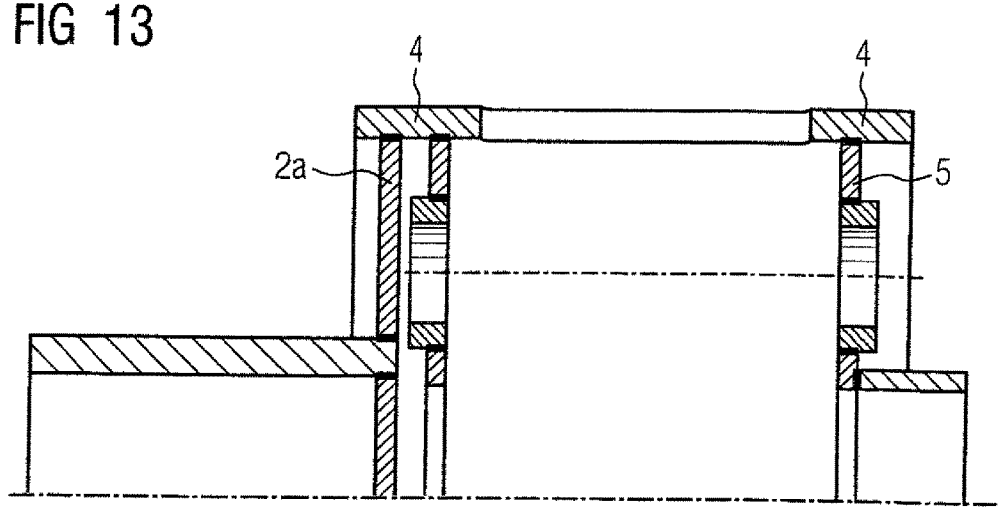
FIG. 13 shows a longitudinal section of a seventh embodiment of a planetary carrier according to the present invention with a two-legged hub bearing.

FIG. 13 shows a planetary carrier with a pipe forming the webs 4, which, at both front sides of the planetary carrier, projects beyond the input-side outer leg 2*a* which acts as a torsion disk and the output-side leg 5.

Figure 14:
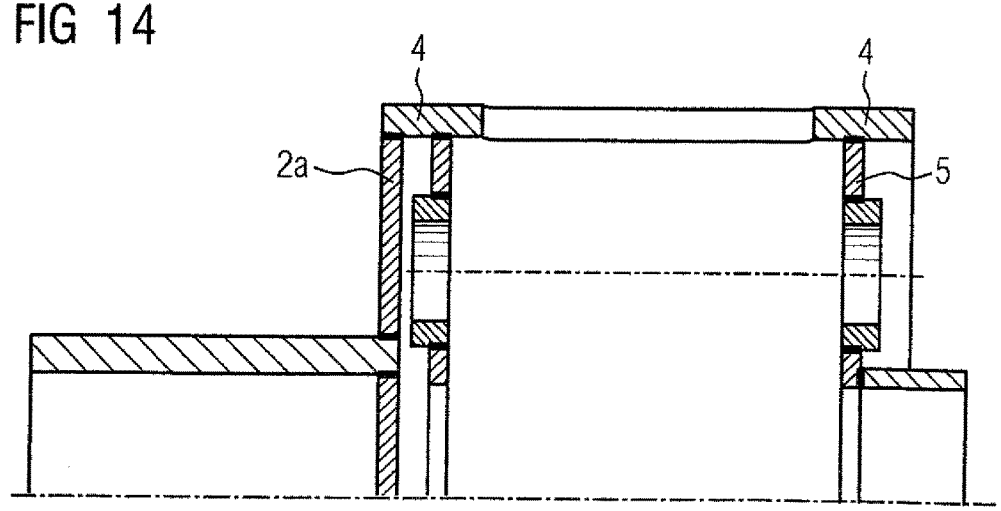
FIG. 14 shows a longitudinal section of an eighth embodiment of a planetary carrier according to the present invention with a two-legged hub bearing.

FIG. 14 shows a planetary carrier with a pipe forming the webs 4, which projects beyond the input-side outer leg 2*a* which acts as a torsion disk. The longer the pipe forming the webs 4, i.e. the larger the protrusion, the higher its torsional strength.

The joining sequence (welding sequence) is advantageously in the sequence of the following steps from a) to g):
a) input-side inner leg 8 with reinforcing ring 18 for module 1.
b) output-side leg 5 with reinforcing ring 19 and output-side hub 7 for module 2.
c) input-side outer leg 2*a* with input-side hub 1 and optional cover plate 16 for module 3.
d) tack-weld web 4 with module 1 for module 4.
e) tack-weld web 4 with module 2 for module 5.
f) weld the module 5.
g) tack-weld and weld modules 3 and 5 to the ready-made planetary carrier.

The torsional strength of the planetary carrier significantly influences the widthwise load-bearing behavior of the cogs. As a result of the input-side inner leg 8 having the input-side axle seat 6*a* being separated from the hub 1 introducing the torque, the shape of the input-side inner leg 8 can be varied such that the torsional deformation of the web 4, which results in a rotational displacement of the output-side leg 5 and thus also in the output-side axle seat 6*b*, can be compensated.

Figure 15:
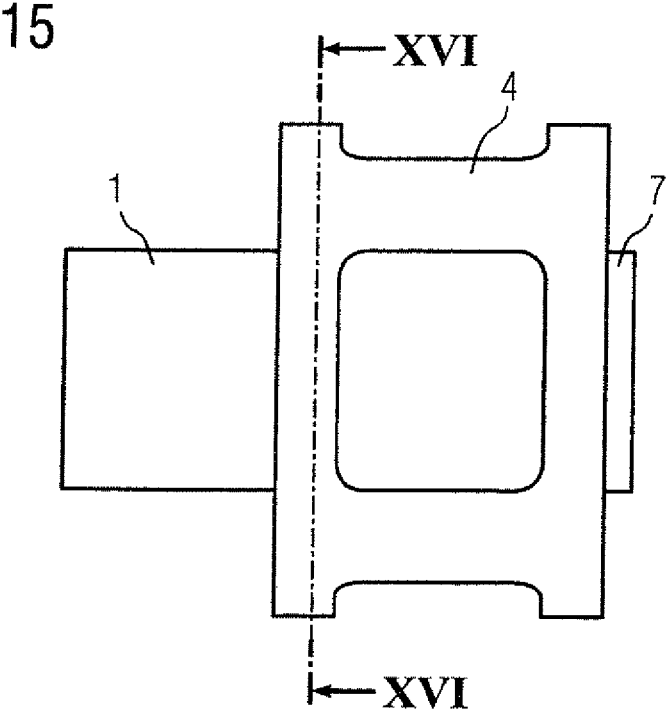
FIG. 15 shows a side view of a planetary carrier according to the present invention.

FIG. 15 shows a side view of a planetary carrier according to the present invention with an input-side hub 1, an output-side hub 7 and a web 4 arranged there-between.

Figure 16:
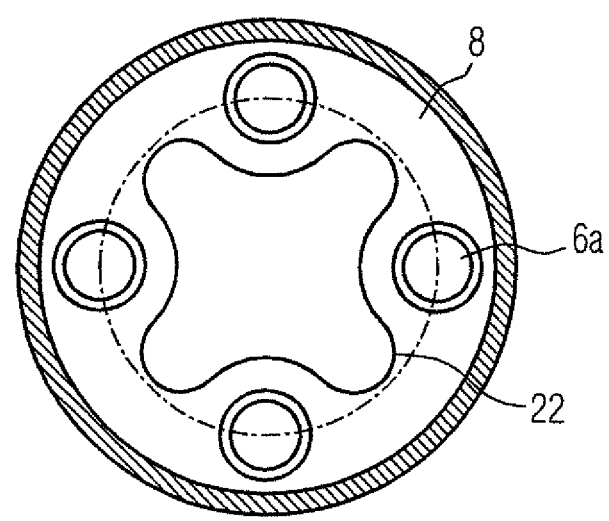
FIG. 16 shows a top view of the planetary carrier of FIG. 15, taken along the section line XVI-XVI in FIG. 15.

FIG. 16 shows a top view of the planetary carrier of FIG. 15, taken along the section line XVI-XVI in FIG. 15. The leg 8 has constrictions 22 between the axle seats 6*a*. The stiffness of the input-side inner leg 8 can be varied by the depth of the constrictions 22.

Figure 17:
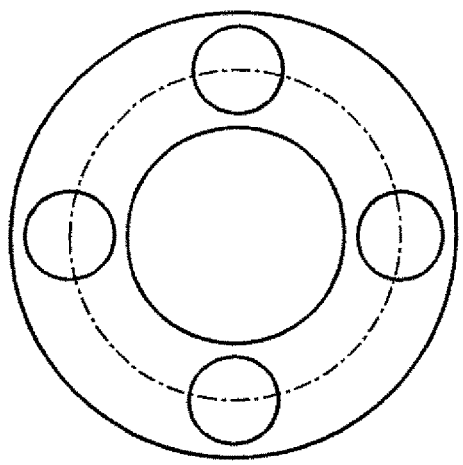
FIG. 17 shows a possible embodiment of the legs.
Figure 18:
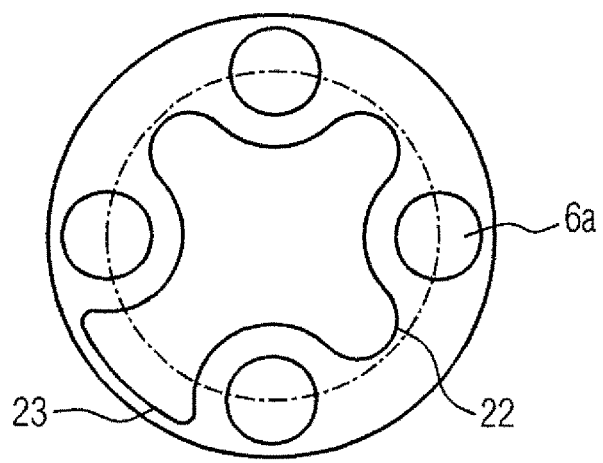
FIG. 18 shows another embodiment of the legs.
Figure 19:
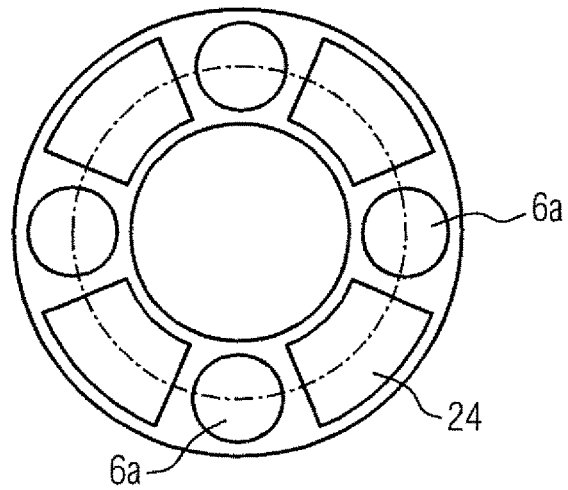
FIG. 19 shows still another possible embodiment of the legs.

FIGS. 17 to 19 show possible embodiments of the legs 5, 8. FIG. 17 shows a full disk with a maximum strength, such as can advantageously be used for the output-side leg 5. FIG. 18 shows constrictions 22, 23 between the axle seats 6*a*. The stiffness of the input-side inner leg 8 can be varied by a different depth of the constrictions 22, 23. FIG. 19 shows a possible embodiment of how the stiffness of the input-side inner leg 8 can vary due to cutouts 24 between the axle seats 6*a*.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A planetary carrier, comprising:
an input-side hub;
an input-side outer leg;
an output-side leg including an output-side axle seat for receiving an output-side end of a planetary axle;
a web connecting the input-side outer leg with the output-side leg; and
an input-side inner leg arranged in parallel to the input-side outer leg, said input-side inner leg including an input-side axle seat for receiving an input-side end of the planetary axle.

2. The planetary carrier of claim 1, wherein the input-side inner leg is fastened to the input-side hub and/or to the input-side outer leg and/or to the web.

3. The planetary carrier of claim 1, wherein a torsional stiffness of an inner load path, which leads from the input-side hub to the input-side axle seat, is adjusted to a torsional stiffness of an outer load path, which leads from an output-side hub to the output-side axle seat, such that under load a defined distortion of the input-side axle seat is established relative to the output-side axle seat.

4. The planetary carrier of claim 1, wherein the planetary carrier is assembled from a number of individual parts.

5. The planetary carrier of claim 4, wherein the individual parts of the planetary carrier are assembled by welded connections or screw connections.

6. The planetary carrier of claim 1, wherein the planetary carrier is assembled from a number of individual parts by welded connections, with relief notches being arranged along a partial length of the welded connections.

7. The planetary carrier of claim 1, wherein the web is formed by a pipe with cutouts for planet wheels of the planetary carrier.

* * * * *